(12) United States Patent
Conway et al.

(10) Patent No.: US 8,891,754 B2
(45) Date of Patent: *Nov. 18, 2014

(54) METHOD AND SYSTEM FOR AUTOMATICALLY ROUTING A TELEPHONIC COMMUNICATION

(71) Applicant: Mattersight Corporation, Chicago, IL (US)

(72) Inventors: Kelly Conway, Lake Bluff, IL (US); Christopher Danson, Austin, TX (US); Douglas Brown, Austin, TX (US); David Gustafson, Lake Bluff, IL (US)

(73) Assignee: Mattersight Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,327

(22) Filed: Mar. 31, 2014

(65) Prior Publication Data

US 2014/0294172 A1    Oct. 2, 2014

Related U.S. Application Data

(63) Continuation of application No. 11/731,478, filed on Mar. 30, 2007, now Pat. No. 8,718,262.

(51) Int. Cl.
   *H04M 3/00*     (2006.01)
   *H04M 5/00*     (2006.01)
   *H04M 3/523*    (2006.01)

(52) U.S. Cl.
   CPC .................................. *H04M 3/5232* (2013.01)
   USPC .................................. 379/265.01; 379/211.01

(58) Field of Classification Search
   USPC ............. 379/211.01–211.02, 265.01–265.12
   See application file for complete search history.

(56) References Cited

U.S. PATENT DOCUMENTS 3,851,121 A   11/1974   Marvin
3,855,416 A   12/1974   Fuller
(Continued)

FOREIGN PATENT DOCUMENTS

EP   0862304   9/1998
EP   0863678   9/1998
(Continued)

OTHER PUBLICATIONS

Abstract of: Retail Banker International, "Efficiency Ratio (ER), Is Increasingly Being Looked to by Bankers, Analysts as a Yardstick of Operating Success, In Era of Permanent Downsizing and Cost Reduction," vol. 341, published in Ireland; Jan. 1996, 2 pages.

(Continued)

*Primary Examiner* — Oleg Asanbayev
(74) *Attorney, Agent, or Firm* — Haynes and Boone, LLP

(57) ABSTRACT

A method for automatically routing a telephonic communication to at least one of a plurality of communication destination addresses is provided. The method is implemented by a computer readable medium having a plurality of code segments. The method comprises the step of receiving customer identifier and communicating with a customer history database configured to store historic data. The method also includes determining whether the received customer identifier corresponds to a stored customer identifier in the customer history database. Historic data corresponding to the stored customer number is identified based on the comparison of the received customer identifier and the stored customer identifier. The telephonic communication is associated with a predetermined communication destination based on the identified historic data. The associated communication data is transmitted to a switching signal.

15 Claims, 8 Drawing Sheets

(56) References Cited

U.S. PATENT DOCUMENTS

| | | |
|---|---|---|
| 3,855,418 A | 12/1974 | Fuller |
| 3,971,034 A | 7/1976 | Bell, Jr. et al. |
| 4,093,821 A | 6/1978 | Williamson |
| 4,142,067 A | 2/1979 | Williamson |
| 4,377,158 A | 3/1983 | Friedman et al. |
| 4,490,840 A | 12/1984 | Jones |
| 4,694,483 A | 9/1987 | Cheung |
| 4,811,131 A | 3/1989 | Sander et al. |
| 4,827,461 A | 5/1989 | Sander |
| 4,835,630 A | 5/1989 | Freer |
| 4,851,937 A | 7/1989 | Sander |
| 4,853,952 A | 8/1989 | Jachmann et al. |
| 4,864,432 A | 9/1989 | Freer |
| 4,873,592 A | 10/1989 | Dulaff et al. |
| 4,888,652 A | 12/1989 | Sander |
| 4,891,835 A | 1/1990 | Leung et al. |
| 4,893,197 A | 1/1990 | Howells et al. |
| 4,958,367 A | 9/1990 | Freer et al. |
| 5,003,575 A | 3/1991 | Chamberlin et al. |
| 5,008,835 A | 4/1991 | Jachmann et al. |
| 5,148,483 A | 9/1992 | Silverman |
| 5,148,493 A | 9/1992 | Bruney |
| 5,206,903 A | 4/1993 | Kohler et al. |
| 5,216,744 A | 6/1993 | Alleyne et al. |
| 5,239,460 A | 8/1993 | LaRoche |
| 5,274,738 A | 12/1993 | Daly et al. |
| 5,299,260 A | 3/1994 | Shaio |
| 5,339,203 A | 8/1994 | Henits et al. |
| D356,783 S | 3/1995 | Demar et al. |
| 5,396,371 A | 3/1995 | Henits et al. |
| 5,446,603 A | 8/1995 | Henits et al. |
| 5,448,420 A | 9/1995 | Henits et al. |
| 5,457,782 A | 10/1995 | Daly et al. |
| 5,467,391 A | 11/1995 | Donaghue, Jr. et al. |
| 5,535,256 A | 7/1996 | Maloney et al. |
| 5,559,875 A | 9/1996 | Bieselin et al. |
| 5,561,707 A | 10/1996 | Katz |
| 5,577,254 A | 11/1996 | Gilbert |
| 5,590,171 A | 12/1996 | Howe et al. |
| 5,590,188 A | 12/1996 | Crockett |
| 5,594,790 A | 1/1997 | Curreri et al. |
| 5,594,791 A | 1/1997 | Szlam et al. |
| 5,621,789 A | 4/1997 | McCalmont et al. |
| 5,633,916 A | 5/1997 | Goldhagen et al. |
| 5,646,981 A | 7/1997 | Klein |
| 5,696,811 A | 12/1997 | Maloney et al. |
| 5,710,884 A | 1/1998 | Dedrick |
| 5,712,954 A | 1/1998 | Dezonno |
| 5,717,742 A | 2/1998 | Hyde-Thomson |
| 5,721,827 A | 2/1998 | Logan et al. |
| 5,724,420 A | 3/1998 | Torgrim |
| 5,732,216 A | 3/1998 | Logan et al. |
| 5,734,890 A | 3/1998 | Case et al. |
| 5,737,405 A | 4/1998 | Dezonno |
| 5,757,904 A | 5/1998 | Anderson |
| 5,764,728 A | 6/1998 | Ala et al. |
| 5,768,513 A | 6/1998 | Kuthyar et al. |
| 5,784,452 A | 7/1998 | Carney |
| 5,790,798 A | 8/1998 | Beckett, II et al. |
| 5,799,063 A | 8/1998 | Krane |
| 5,809,250 A | 9/1998 | Kisor |
| 5,815,551 A | 9/1998 | Katz |
| 5,818,907 A | 10/1998 | Maloney et al. |
| 5,818,909 A | 10/1998 | Van Berkum et al. |
| 5,819,005 A | 10/1998 | Daly et al. |
| 5,822,306 A | 10/1998 | Catchpole |
| 5,822,400 A | 10/1998 | Smith |
| 5,822,410 A | 10/1998 | McCausland et al. |
| 5,822,744 A | 10/1998 | Kesel |
| 5,825,869 A | 10/1998 | Brooks et al. |
| 5,828,730 A | 10/1998 | Zebryk et al. |
| 5,841,966 A | 11/1998 | Irribarren |
| 5,845,290 A | 12/1998 | Yoshii |
| 5,848,396 A | 12/1998 | Gerace |
| 5,854,832 A | 12/1998 | Dezonno |
| 5,857,175 A | 1/1999 | Day et al. |
| 5,859,898 A | 1/1999 | Checco |
| 5,864,616 A | 1/1999 | Hartmeier |
| 5,870,549 A | 2/1999 | Bobo, II |
| 5,875,436 A | 2/1999 | Kikinis |
| 5,878,384 A | 3/1999 | Johnson et al. |
| 5,884,032 A | 3/1999 | Bateman et al. |
| 5,884,262 A | 3/1999 | Wise et al. |
| 5,894,512 A | 4/1999 | Zenner |
| 5,897,616 A | 4/1999 | Kanevsky et al. |
| 5,903,641 A | 5/1999 | Tonisson |
| 5,910,107 A | 6/1999 | Hiff |
| 5,911,776 A | 6/1999 | Guck |
| 5,914,951 A | 6/1999 | Bentley et al. |
| 5,915,001 A | 6/1999 | Uppaluru |
| 5,915,011 A | 6/1999 | Miloslavsky |
| 5,923,746 A | 7/1999 | Baker |
| 5,926,538 A | 7/1999 | Deryugin et al. |
| 5,930,764 A | 7/1999 | Melchione et al. |
| 5,937,029 A | 8/1999 | Yosef |
| 5,940,476 A | 8/1999 | Morganstein et al. |
| 5,940,494 A | 8/1999 | Rafacz |
| 5,940,792 A | 8/1999 | Hollier |
| 5,943,416 A | 8/1999 | Gisby |
| 5,945,989 A | 8/1999 | Freishtat |
| 5,946,375 A | 8/1999 | Pattison et al. |
| 5,946,388 A | 8/1999 | Walker et al. |
| 5,951,643 A | 9/1999 | Shelton et al. |
| 5,953,389 A | 9/1999 | Pruett |
| 5,953,406 A | 9/1999 | LaRue et al. |
| 5,964,839 A | 10/1999 | Johnson et al. |
| 5,978,465 A | 11/1999 | Corduroy et al. |
| 5,987,415 A | 11/1999 | Breese et al. |
| 5,991,735 A | 11/1999 | Gerace |
| 6,003,013 A | 12/1999 | Boushy et al. |
| 6,006,188 A | 12/1999 | Bogdashevsky et al. |
| 6,009,163 A | 12/1999 | Nabkel et al. |
| 6,014,647 A | 1/2000 | Nizzari et al. |
| 6,021,428 A | 2/2000 | Miloslavsky |
| 6,026,397 A | 2/2000 | Sheppard |
| 6,029,153 A | 2/2000 | Bauchner et al. |
| 6,058,163 A | 5/2000 | Pattison et al. |
| 6,064,731 A | 5/2000 | Flockhart et al. |
| 6,078,891 A | 6/2000 | Riordan |
| 6,108,711 A | 8/2000 | Beck et al. |
| 6,128,380 A | 10/2000 | Shaffer et al. |
| 6,151,571 A | 11/2000 | Pertrushin |
| 6,173,053 B1 | 1/2001 | Bogart et al. |
| 6,185,534 B1 | 2/2001 | Breese et al. |
| 6,195,426 B1 | 2/2001 | Bolduc et al. |
| 6,205,215 B1 | 3/2001 | Dombakly |
| 6,212,502 B1 | 4/2001 | Ball et al. |
| 6,243,684 B1 | 6/2001 | Stuart et al. |
| 6,246,752 B1 | 6/2001 | Bscheider et al. |
| 6,249,570 B1 | 6/2001 | Glowny et al. |
| 6,252,946 B1 | 6/2001 | Glowny et al. |
| 6,252,947 B1 | 6/2001 | Diamond et al. |
| 6,275,806 B1 | 8/2001 | Pertrushin |
| 6,286,030 B1 | 9/2001 | Wenig et al. |
| 6,289,094 B1 | 9/2001 | Miloslavsky |
| 6,295,353 B1 | 9/2001 | Flockhart et al. |
| 6,330,025 B1 | 12/2001 | Arazi et al. |
| 6,334,110 B1 | 12/2001 | Walter et al. |
| 6,345,094 B1 | 2/2002 | Khan et al. |
| 6,353,810 B1 | 3/2002 | Pertrushin |
| 6,363,145 B1 | 3/2002 | Shaffer et al. |
| 6,363,346 B1 | 3/2002 | Walters |
| 6,366,658 B1 | 4/2002 | Bjornberg et al. |
| 6,366,666 B2 | 4/2002 | Bengtson et al. |
| 6,370,574 B1 | 4/2002 | House et al. |
| 6,389,132 B1 | 5/2002 | Price |
| 6,392,666 B1 | 5/2002 | Hong et al. |
| 6,404,857 B1 | 6/2002 | Blair et al. |
| 6,404,883 B1 | 6/2002 | Hartmeier |
| 6,411,687 B1 | 6/2002 | Bohacek et al. |
| 6,411,708 B1 | 6/2002 | Khan |
| 6,424,709 B1 | 7/2002 | Doyle et al. |
| 6,434,230 B1 | 8/2002 | Gabriel |
| 6,434,231 B2 | 8/2002 | Neyman et al. |

(56) References Cited

U.S. PATENT DOCUMENTS

| | | |
|---|---|---|
| 6,446,119 B1 | 9/2002 | Olah et al. |
| 6,466,663 B1 | 10/2002 | Ravenscroft et al. |
| 6,480,601 B1 | 11/2002 | McLaughlin |
| 6,480,826 B2 | 11/2002 | Pertrushin |
| 6,490,560 B1 | 12/2002 | Ramaswamy et al. |
| 6,510,220 B1 | 1/2003 | Beckett et al. |
| 6,535,601 B1 | 3/2003 | Flockhart et al. |
| 6,542,156 B1 | 4/2003 | Hong et al. |
| 6,542,602 B1 | 4/2003 | Elazar |
| 6,553,112 B2 | 4/2003 | Ishikawa |
| 6,556,976 B1 | 4/2003 | Callen |
| 6,567,504 B1 | 5/2003 | Kercheval et al. |
| 6,567,787 B1 | 5/2003 | Walker et al. |
| 6,574,605 B1 | 6/2003 | Sanders et al. |
| 6,598,020 B1 | 7/2003 | Kleindienst et al. |
| 6,600,821 B1 | 7/2003 | Chan et al. |
| 6,601,031 B1 | 7/2003 | O'Brien |
| 6,611,498 B1 | 8/2003 | Baker et al. |
| 6,628,777 B1 | 9/2003 | McIllwaine et al. |
| 6,643,622 B2 | 11/2003 | Stuart et al. |
| 6,647,372 B1 | 11/2003 | Brady et al. |
| 6,658,388 B1 | 12/2003 | Kleindienst et al. |
| 6,658,391 B1 | 12/2003 | Williams et al. |
| 6,662,156 B2 | 12/2003 | Bartosik |
| 6,665,644 B1 | 12/2003 | Kanevsky et al. |
| 6,674,447 B1 | 1/2004 | Chiang et al. |
| 6,691,073 B1 | 2/2004 | Erten et al. |
| 6,700,972 B1 | 3/2004 | McHugh et al. |
| 6,721,417 B2 | 4/2004 | Saito et al. |
| 6,721,704 B1 | 4/2004 | Strubbe et al. |
| 6,724,887 B1 | 4/2004 | Eilbacher et al. |
| 6,728,345 B2 | 4/2004 | Glowny et al. |
| 6,731,307 B1 | 5/2004 | Strubbe et al. |
| 6,731,744 B1 | 5/2004 | Khuc et al. |
| 6,735,298 B2 | 5/2004 | Neyman et al. |
| 6,741,697 B2 | 5/2004 | Benson et al. |
| 6,744,877 B1 | 6/2004 | Edwards |
| 6,751,297 B2 | 6/2004 | Nelkenbaum |
| 6,757,361 B2 | 6/2004 | Blair et al. |
| 6,760,414 B1 | 7/2004 | Schurko et al. |
| 6,760,727 B1 | 7/2004 | Schroeder et al. |
| 6,766,012 B1 | 7/2004 | Crossley |
| 6,775,372 B1 | 8/2004 | Henits |
| 6,782,093 B2 | 8/2004 | Uckun |
| 6,785,369 B2 | 8/2004 | Diamond et al. |
| 6,785,370 B2 | 8/2004 | Glowny et al. |
| 6,788,768 B1 | 9/2004 | Saylor et al. |
| 6,798,876 B1 | 9/2004 | Bala |
| 6,839,671 B2 | 1/2005 | Attwater et al. |
| 6,842,405 B1 | 1/2005 | D'Agosto, III |
| 6,853,966 B2 | 2/2005 | Bushey et al. |
| 6,864,901 B2 | 3/2005 | Chang et al. |
| 6,865,604 B2 | 3/2005 | Nisani et al. |
| 6,868,392 B1 | 3/2005 | Ogasawara |
| 6,870,920 B2 | 3/2005 | Henits |
| 6,871,229 B2 | 3/2005 | Nisani et al. |
| 6,880,004 B2 | 4/2005 | Nisani et al. |
| 6,937,706 B2 | 8/2005 | Bscheider et al. |
| 6,959,078 B1 | 10/2005 | Eilbacher et al. |
| 6,959,079 B2 | 10/2005 | Elazar |
| 7,010,106 B2 | 3/2006 | Gritzer et al. |
| 7,010,109 B2 | 3/2006 | Gritzer et al. |
| 7,027,708 B2 | 4/2006 | Nygren et al. |
| 7,043,745 B2 | 5/2006 | Nygren et al. |
| 7,149,788 B1 | 12/2006 | Gundla et al. |
| 7,203,285 B2 | 4/2007 | Blair |
| 7,216,162 B2 | 5/2007 | Amit et al. |
| 7,219,138 B2 | 5/2007 | Straut et al. |
| 7,305,082 B2 | 12/2007 | Elazar et al. |
| 7,333,445 B2 | 2/2008 | Ilan et al. |
| 7,346,186 B2 | 3/2008 | Sharoni et al. |
| 7,376,735 B2 | 5/2008 | Straut et al. |
| 8,718,262 B2 | 5/2014 | Conway et al. |
| 2001/0043685 A1 | 11/2001 | Bscheider et al. |
| 2002/0002460 A1 | 1/2002 | Pertrushin |
| 2002/0002464 A1 | 1/2002 | Pertrushin |
| 2002/0010587 A1 | 1/2002 | Pertrushin |
| 2002/0110264 A1 | 8/2002 | Sharoni et al. |
| 2002/0111811 A1 | 8/2002 | Bares et al. |
| 2002/0133394 A1 | 9/2002 | Bushey et al. |
| 2002/0143599 A1 | 10/2002 | Nourbakhsh et al. |
| 2002/0194002 A1 | 12/2002 | Petrushin |
| 2003/0033145 A1 | 2/2003 | Petrushin |
| 2003/0033152 A1 | 2/2003 | Cameron |
| 2003/0069780 A1 | 4/2003 | Hailwood et al. |
| 2003/0072463 A1 | 4/2003 | Chen |
| 2003/0108183 A1 | 6/2003 | Dhir et al. |
| 2003/0142122 A1 | 7/2003 | Straut et al. |
| 2003/0144900 A1 | 7/2003 | Whitmer |
| 2003/0145140 A1 | 7/2003 | Straut et al. |
| 2003/0154092 A1 | 8/2003 | Bouron et al. |
| 2004/0041830 A1 | 3/2004 | Chiang et al. |
| 2004/0054715 A1 | 3/2004 | Cesario |
| 2004/0073569 A1 | 4/2004 | Knott et al. |
| 2004/0100507 A1 | 5/2004 | Hayner et al. |
| 2004/0101127 A1 | 5/2004 | Dezonno et al. |
| 2004/0103409 A1 | 5/2004 | Hayner et al. |
| 2004/0117185 A1 | 6/2004 | Scarano et al. |
| 2004/0158869 A1 | 8/2004 | Safran et al. |
| 2004/0162724 A1 | 8/2004 | Hill et al. |
| 2004/0181376 A1 | 9/2004 | Fables et al. |
| 2004/0190687 A1 | 9/2004 | Baker |
| 2004/0249636 A1 | 12/2004 | Applebaum et al. |
| 2004/0249650 A1 | 12/2004 | Freedman et al. |
| 2004/0264652 A1 | 12/2004 | Erhart et al. |
| 2005/0010411 A1 | 1/2005 | Rigazio et al. |
| 2005/0010415 A1 | 1/2005 | Hagen et al. |
| 2005/0018622 A1 | 1/2005 | Halbraich et al. |
| 2005/0108383 A1 | 5/2005 | DeHaas et al. |
| 2005/0108775 A1 | 5/2005 | Bachar et al. |
| 2005/0123115 A1 | 6/2005 | Gritzer et al. |
| 2005/0204378 A1 | 9/2005 | Gabay |
| 2005/0240656 A1 | 10/2005 | Blair |
| 2006/0028488 A1 | 2/2006 | Gabay et al. |
| 2006/0045185 A1 | 3/2006 | Kiryati et al. |
| 2006/0074898 A1 | 4/2006 | Gavalda et al. |
| 2006/0089837 A1 | 4/2006 | Adar et al. |
| 2006/0111904 A1 | 5/2006 | Wasserblat et al. |
| 2006/0123106 A1 | 6/2006 | Blair et al. |
| 2006/0126817 A1 | 6/2006 | Beckett, II et al. |
| 2006/0133624 A1 | 6/2006 | Waserblat et al. |
| 2006/0150229 A1 | 7/2006 | Blair et al. |
| 2006/0168188 A1 | 7/2006 | Dutton |
| 2006/0200520 A1 | 9/2006 | Vernon et al. |
| 2006/0200832 A1 | 9/2006 | Dutton |
| 2006/0212295 A1 | 9/2006 | Wasserblat et al. |
| 2006/0227719 A1 | 10/2006 | Halbraich |
| 2006/0262919 A1 | 11/2006 | Danson et al. |
| 2006/0262920 A1 | 11/2006 | Conway et al. |
| 2006/0265088 A1 | 11/2006 | Warford et al. |
| 2006/0265089 A1 | 11/2006 | Conway et al. |
| 2006/0265090 A1 | 11/2006 | Conway et al. |
| 2006/0268847 A1 | 11/2006 | Halbraich et al. |
| 2006/0285665 A1 | 12/2006 | Wasserblat et al. |
| 2007/0019634 A1 | 1/2007 | Fisher et al. |
| 2007/0083540 A1 | 4/2007 | Gundla et al. |
| 2007/0094408 A1 | 4/2007 | Gundla et al. |
| 2007/0106791 A1 | 5/2007 | Blumenau |
| 2007/0106792 A1 | 5/2007 | Blumenau |
| 2007/0160189 A1 | 7/2007 | Blair |
| 2007/0160190 A1 | 7/2007 | Blair |
| 2007/0160191 A1 | 7/2007 | Blair |
| 2007/0195944 A1 | 8/2007 | Korenblit et al. |
| 2007/0195945 A1 | 8/2007 | Korenblit et al. |
| 2007/0198284 A1 | 8/2007 | Korenblit et al. |
| 2007/0198322 A1 | 8/2007 | Bourne et al. |
| 2007/0198323 A1 | 8/2007 | Bourne et al. |
| 2007/0198325 A1 | 8/2007 | Lyerly et al. |
| 2007/0198329 A1 | 8/2007 | Lyerly et al. |
| 2007/0198330 A1 | 8/2007 | Korenblit et al. |
| 2007/0206764 A1 | 9/2007 | Keren et al. |
| 2007/0206766 A1 | 9/2007 | Keren et al. |
| 2007/0206767 A1 | 9/2007 | Keren et al. |
| 2007/0206768 A1 | 9/2007 | Bourne et al. |

(56) References Cited

U.S. PATENT DOCUMENTS

| | | |
|---|---|---|
| 2007/0217576 A1 | 9/2007 | Blair |
| 2007/0230345 A1 | 10/2007 | Spohrer et al. |
| 2007/0230444 A1 | 10/2007 | Williams et al. |
| 2007/0230446 A1 | 10/2007 | Williams et al. |
| 2007/0230478 A1 | 10/2007 | Dong et al. |
| 2007/0237525 A1 | 10/2007 | Spohrer et al. |
| 2007/0250318 A1 | 10/2007 | Waserblat et al. |
| 2007/0258434 A1 | 11/2007 | Williams et al. |
| 2007/0263785 A1 | 11/2007 | Williams et al. |
| 2007/0263786 A1 | 11/2007 | Dong et al. |
| 2007/0263787 A1 | 11/2007 | Dong et al. |
| 2007/0263788 A1 | 11/2007 | Spohrer et al. |
| 2007/0274505 A1 | 11/2007 | Gupta et al. |
| 2007/0282807 A1 | 12/2007 | Ringelman et al. |
| 2007/0297578 A1 | 12/2007 | Blair et al. |
| 2008/0002719 A1 | 1/2008 | Byrd et al. |
| 2008/0002823 A1 | 1/2008 | Fama et al. |
| 2008/0004945 A1 | 1/2008 | Watson et al. |
| 2008/0005307 A1 | 1/2008 | Byrd et al. |
| 2008/0005318 A1 | 1/2008 | Dong et al. |
| 2008/0005568 A1 | 1/2008 | Watson et al. |
| 2008/0005569 A1 | 1/2008 | Watson et al. |
| 2008/0005588 A1 | 1/2008 | Watson et al. |
| 2008/0040110 A1 | 2/2008 | Pereg et al. |
| 2008/0052535 A1 | 2/2008 | Spohrer et al. |
| 2008/0065902 A1 | 3/2008 | Spohrer et al. |
| 2008/0080385 A1 | 4/2008 | Blair |
| 2008/0080386 A1 | 4/2008 | Calahan et al. |
| 2008/0080481 A1 | 4/2008 | Calahan et al. |
| 2008/0080482 A1 | 4/2008 | Calahan et al. |
| 2008/0080483 A1 | 4/2008 | Calahan et al. |
| 2008/0080531 A1 | 4/2008 | Williams et al. |
| 2008/0080685 A1 | 4/2008 | Barnes et al. |
| 2008/0080698 A1 | 4/2008 | Williams et al. |
| 2008/0082329 A1 | 4/2008 | Watson |
| 2008/0082330 A1 | 4/2008 | Blair |
| 2008/0082336 A1 | 4/2008 | Duke et al. |
| 2008/0082340 A1 | 4/2008 | Blair et al. |
| 2008/0082341 A1 | 4/2008 | Blair |
| 2008/0082502 A1 | 4/2008 | Gupta |
| 2008/0082669 A1 | 4/2008 | Williams et al. |
| 2014/0044255 A1 | 2/2014 | Chishti et al. |

FOREIGN PATENT DOCUMENTS

| | | |
|---|---|---|
| EP | 0998108 | 5/2000 |
| EP | 1361739 | 11/2003 |
| EP | 1635534 | 3/2006 |
| GB | 2331201 | 5/1999 |
| GB | 2389736 | 12/2003 |
| WO | WO0174042 | 10/2001 |
| WO | WO 0217165 | 2/2002 |
| WO | WO 02073413 | 9/2002 |
| WO | WO 03001809 | 1/2003 |
| WO | WO 03009175 | 1/2003 |
| WO | WO 2006124942 | 11/2006 |
| WO | WO 2006124945 | 11/2006 |
| WO | WO 2006125047 | 11/2006 |
| WO | WO 2007100345 | 9/2007 |
| WO | WO 2007106113 | 9/2007 |

OTHER PUBLICATIONS

Abstract of: Call Center Magazine, "The Most Innovative Call Center Products We Saw in 1999," vol. 13, No. 2, 9 pages.

Abstract of: Kohli, Rajiv, et al., Journal of System Management, "Strategic Application of Organization Data Through Customer Relational Databases," vol. 44, No. 10, Oct. 1993, 7 pages.

Abstract of: Sullivan, Kristina B., PC Week, Product Announcement, "Software Helps Salespeople Generate New Leads," vol. 3, No. 38, Sep. 1986, 1 page.

Abstract of: Garrison, P., Computing for Business, "An Electric Sales Call File," vol. 9, No. 4, Apr. 1984, 2 pages.

Abstract of: Killenbrew, Wayne, et al., Telephony, "Playing by the Rules," vol. 235, No. 25, Dec. 1998, 4 pages.

Abstract of: Testa, Bridget Mintz, Telecommunications Americas, "Call Monitoring Gets Emotional," vol. 38, No. 13, Dec. 2004, 1 page.

Abstract of: Tan, Run-Hua, et al., Journal of Hebei University of Technology, "Innovation Design of Product Based on TRIZ," vol. 33, No. 2, 2004.

Abstract of: Newswire, "etalk and Utopy to Provide Enhanced Quality Monitoring and Speech Analytics Solutions to Contact Centers," Apr. 2003, 2 pages.

METHOD AND SYSTEM FOR AUTOMATICALLY ROUTING A TELEPHONIC COMMUNICATION

CROSS-REFERENCE TO RELATED APPLICATIONS

This application is a continuation of U.S. application Ser. No. 11/731,478 filed Mar. 30, 2007, the entire contents of which is hereby incorporated herein its entirety by express reference thereto.

TECHNICAL FIELD

The invention relates to a method and system for routing a telephonic communication, and more particularly, for automatically routing future a telephone communication based on prior analytic attributes.

BACKGROUND OF THE INVENTION

It is known to utilize telephone call centers to facilitate the receipt, response and routing of incoming telephone calls relating to customer service, retention, and sales. A customer is in contact with a customer service representative ("CSR") or CSR agent who is responsible for answering the customer's inquiries and directing the customer to the appropriate individual, department, information source, or service as required to satisfy the customer's needs. It is well known to monitor calls between a customer and agent. Accordingly call centers typically employ individuals responsible for listening to the conversation between the customer and the agent. While monitoring such calls may occur in real time, it is often more efficient and useful to record the call for later review.

Information gathered from the calls is typically used to monitor the performance of the CSR agents to identify any possible training needs. Based on a review and analysis of the conversation, a monitor will make suggestions or recommendations to improve the quality of a customer's experience.

In many instances, call centers receive calls from repeat customer. The repeat customer may require assistance with a new issue or additional assistance with a prior issue. However, a customer may also have had particularly favorable, or particularly poor prior interactions with a customer service representative or transaction experience during a prior call. This favorable or poor interaction may have been a result of behavioral or non-behavioral compatibility with the responding customer service representative, response time, lack of knowledge, inaccessibility to direct contact with a customer service representative or various other analytic attributes or factors.

Thus, there is a need in customer relationship management ("CRM") for tools useful in improving the quality of future customer interactions with agents by intuitively and automatically routing future calls by the same customer to an appropriate communication destination; whether a self-service destination or a compatible customer service representative. In particular, a need exists for tools that will allow for future call routing based on data collected during prior calls.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

According to the present invention, a computer program for automatically routing a telephonic communication to at least one of a plurality of communication destination addresses is provided. The computer program is embodied on a computer readable storage medium adapted to control a computer. The computer program comprises a plurality of code segments for performing the task. In particular, a code segment receives a customer identifier. The computer program then determines whether the received customer identifier corresponds to a customer identifier stored in a customer history database. The customer history database is configured to store historic data associated with recorded telephonic communications having a corresponding stored customer identifiers. More particularly, the stored historic data includes at least one of the following: call type data, distress assessment data, behavioral assessment data, call preference data and customer profile. The historic data corresponding to the received customer identifier and the stored customer identifier is analyzed, and the telephonic communication is associated with one of a plurality of communication destination addresses. The associating is based on the analysis of the historic data. The computer program then transmits a signal identifying the associated communication destination address.

According to one aspect of the present invention, the computer program compares a stored customer profile with a customer service representative profile. A code segment also generates a score based upon the comparison of the customer profile with the customer service representative profile.

According to another aspect of the invention, an audible message is transmitted based on association of the telephonic communication with a communication destination address. A code segment of the computer program can also be provided to generate a customer route record.

According to still another aspect of the invention, the computer program analyzes the frequency of completed transactions in IVR. An audible message can be generated based on the frequency, indicating that a customer identifier completes transactions in IVR.

According to the present invention, a system for automatically routing a telephonic communication to one of a plurality of communication destination addresses is also provided. The system includes a customer history database and a first server configured to receive a customer identifier from a communication system. The customer history database stores historic data comprised of at least one of the following: call type data, distress assessment data, behavioral assessment data, call preference data, and customer profile. Further, the historic data being associated with a stored customer identifier.

The first server includes logic, or executable instructions in the form of code segments or the like, to execute various functions. More particularly, the first server includes logic for communicating with the customer history database. Logic is provided for determining whether the received customer identifier corresponds to a stored customer identifier in the customer history database. When the received customer identifier corresponds to a stored customer identifier in the customer history database, historic data corresponding to the received customer identifier is analyzed. The first server also includes logic for associating the telephonic communication with one of a plurality of communication destination addresses. This association is based on the analysis of the historic data corresponding to the received customer identifier. Logic is provided for communicating the associated communication destination to a switch. The switch is configured to route the telephonic communication to the associated communication destination address.

According to still another aspect of the present invention, the system is further comprised of a second server in operable communication with the first server. The second server is configured to record a telephonic communication between a caller and a customer service representative and includes logic for doing so. In particular, logic is provided to separate a telephonic communication into at least caller voice data and customer service representative voice data. The server also includes logic for analyzing at least the caller voice data by mining the separated caller voice data and applying a predetermined linguistic-based psychological behavioral model to the separated caller voice data. Behavioral assessment data corresponding to the analyzed caller voice data is then generated. The resultant behavioral assessment data can be transmitted to the customer history database.

According to yet another aspect, the logic for separating the telephonic communication into a caller voice data and a customer service representative includes logic for identifying a communication protocol associated with the telephonic communication and logic for recording the telephonic communication to a first electronic data file having a first and second audio track. The caller voice data is automatically recorded on the first audio track based on the identified communication protocol. The customer service representative voice data is automatically recorded on the second audio track based on the identified communication protocol.

According to one embodiment of the present invention, the system for automatically routing a telephonic communication to one of a plurality of communication destination addresses includes an interactive voice response (IVR) system, a telephone switch, a routing server and a recording server. The IVR is configured to receive telephonic communications and caller commands and to communicate with the telephone switch and the routing server. The telephone switch is configured to route a telephonic communication to one of a plurality of communication destination addresses.

The recording server is operably coupled, and in operable communication with the routing server. As discussed above, the recording server is configured to record a telephonic communication between a caller and a customer service representative. The recording server uses logic to perform the recording functions as described above. As previously noted, the logic can be in the form of hardwired logic gates or software. Thus, logic is provided to generate behavioral assessment data. According to one embodiment, the behavioral assessment data is generated by analyzing the caller voice data by mining caller voice data associated with the telephonic communication. A linguistic-based psychological behavioral model is applied to the caller voice data. Logic is also provided to generate distress assessment data and call preference data. The generated behavioral assessment data, distress assessment data and call preference data to is transmitted to a customer history database as described above.

According to one embodiment of the invention, the routing server is configured to receive a transmitted customer identifier from the interactive voice response system. The routing server also includes logic, or executable instructions in the form of code segments or the like, for performing the desired routing function. In particular, logic is provided to receive a customer identifier. The server includes logic to determine whether the received customer identifier corresponds to a stored customer identifier in a customer history database. As discussed herein, the customer history database is configured to store historic data. That historic data is associated with at least one recorded telephonic communication having a corresponding stored customer identifier. The stored historic data includes one or more of the following: call type data, distress assessment data, behavioral assessment data, call preference data and customer profile.

The routing server analyzes the historic data corresponding to the received customer identifier and the stored customer identifier. The telephonic communication is then associated with one of a plurality of communication destination addresses. This association is based on the analysis of the historic data. The routing sever then transmits a signal identifying the associated communication destination address.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
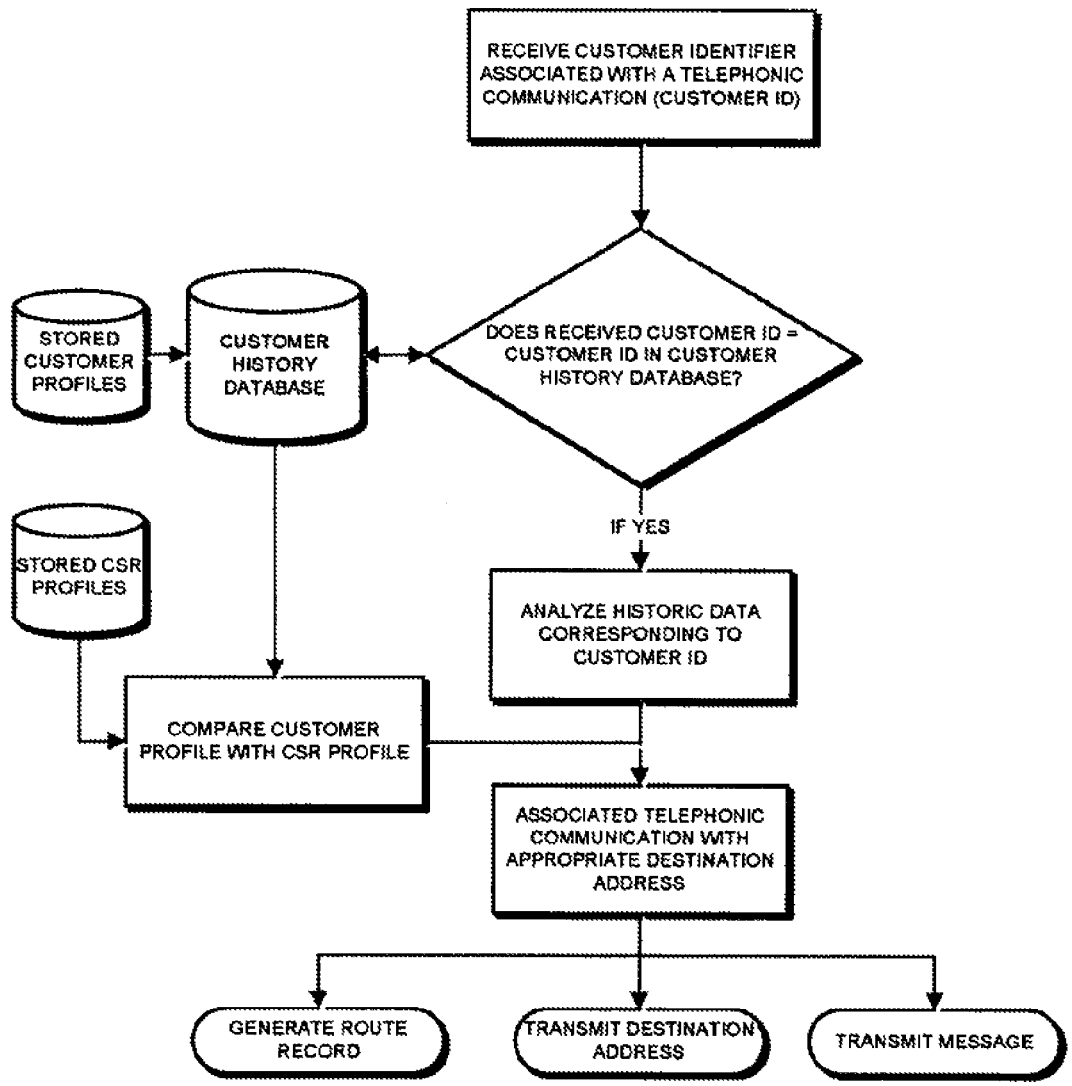
FIG. 1 a flow chart illustrating a method of routing a telephonic communication according to the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-8, a method and system for analyzing an electronic communication between a customer and a contact center is provided. A "contact center" as used herein can include any facility or system server suitable for receiving and recording electronic communications from customers. Such communications can include, for example, telephone calls, facsimile transmissions, e-mails, web interactions, voice-over IP ("VoIP") and video. It is contemplated that these communications may be transmitted by and through any type of telecommunication device and over any medium suitable for carrying data. For example, the communications may be transmitted by or through telephone lines, cable or wireless communications. The contact center of the present invention is adapted to receive and route telephone calls that occur between a customer (or caller) and a contact center during fulfillment of a customer/agent transaction.

Figure 2:
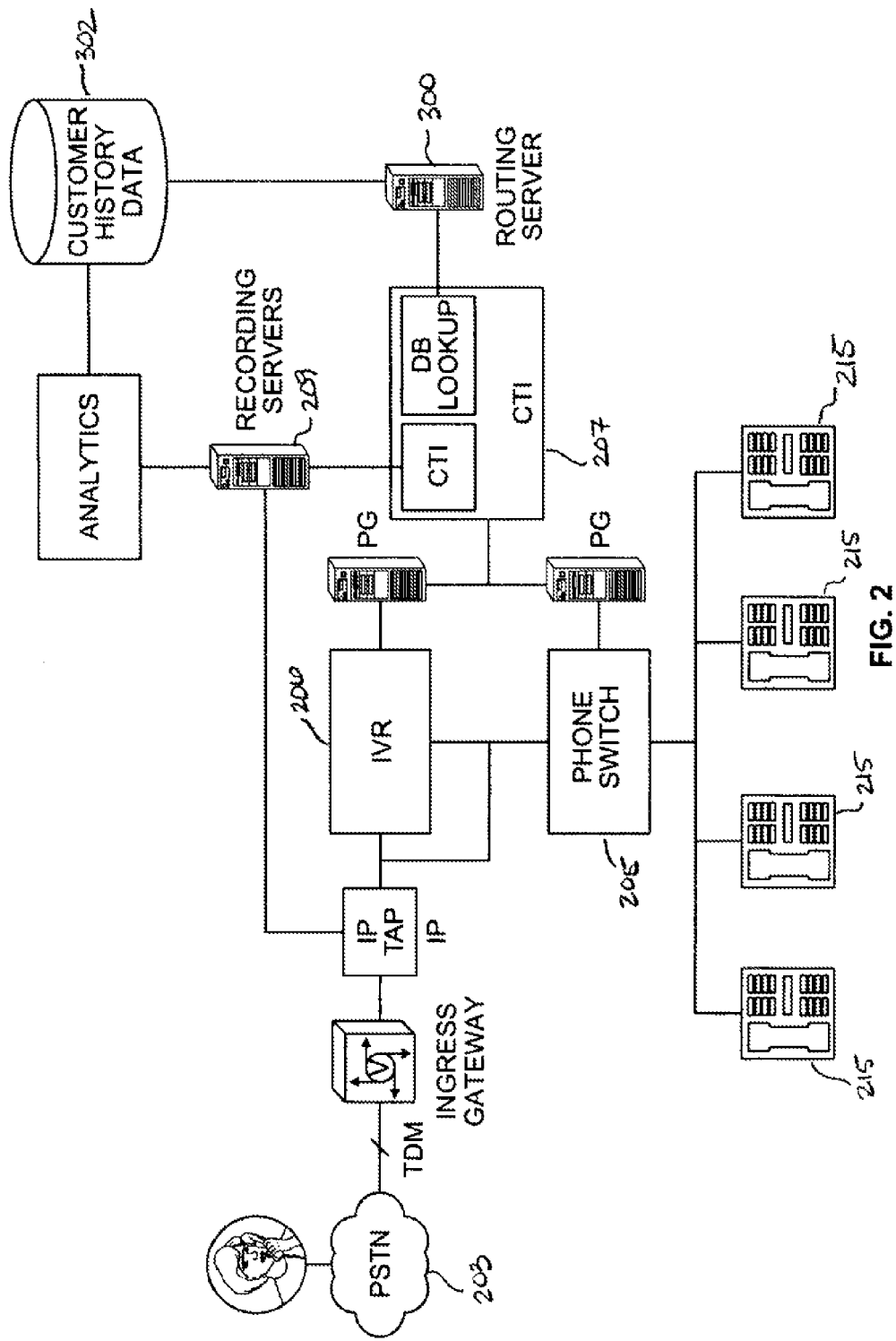
FIG. 2 is a block diagram of the architecture for the system for routing a telephonic communication in accordance with to the present invention.

As shown in FIGS. 1 and 2, one embodiment of the system used in connection with the present method includes an interactive voice response (IVR) system 206, a telephone switch or switching system 205, a routing server 306 and a recording server 209. As will be described in further detail below, a customer identifier associated with a telephonic communication is received. Based on the received customer identifier, and stored historic data associated with the customer identifier, the telephonic communication is routed to a desired communication destination address. It is contemplated that the method for routing a telephonic communication of the present invention can be implemented by a computer program. Now is described in more specific terms, the computer hardware associated with operating the computer program that may be used in connection with the present invention.

Process descriptions or blocks in figures should be understood as representing modules, segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 3:
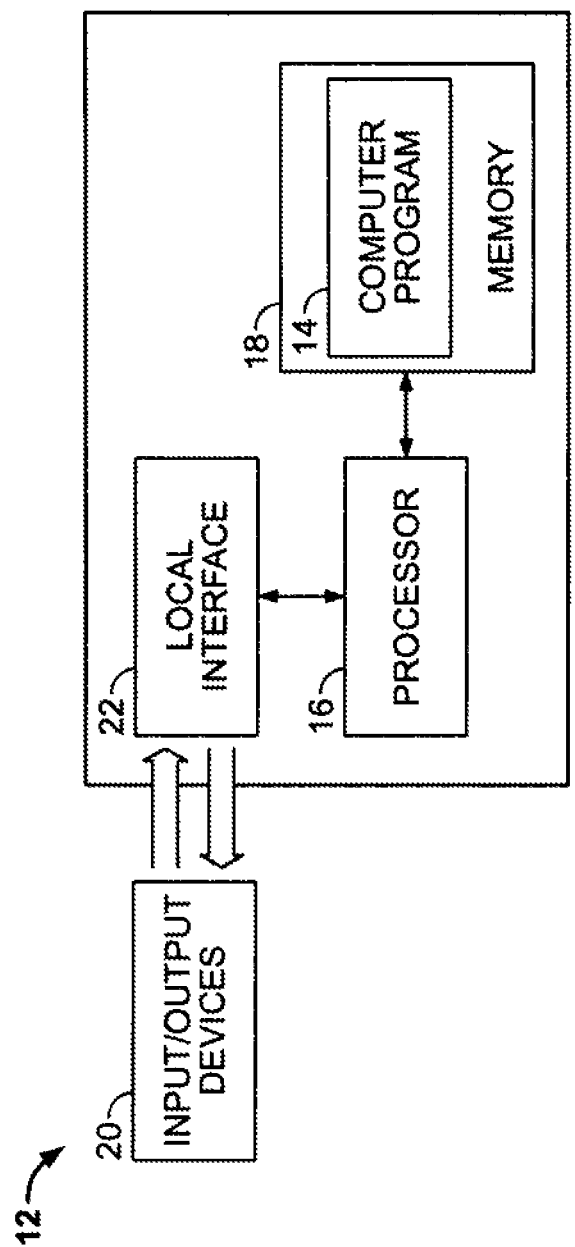
FIG. 3 is a block diagram of a computer used in connection with the present invention.

FIG. 3 is a block diagram of a computer or server 12. For purposes of understanding the hardware as described herein, the terms "computer" and "server" have identical meanings and are interchangeably used. Computer 12 includes control system 14. The control system 14 of the invention can be implemented in software (e.g., firmware), hardware, or a combination thereof. In a currently contemplated preferred embodiment, the control system 14 is implemented as an executable program in software, and is executed by one or more special or general purpose digital computer(s), such as a personal computer (PC; IBM-compatible, Apple-compatible, or otherwise), personal digital assistant, workstation, minicomputer, or mainframe computer. An example of a general purpose computer that can implement the control system 14 of the present invention is shown in FIG. 3. The control system 14 may reside in, or have portions residing in, any computer such as, but not limited to, a general purpose personal computer. Therefore, computer 12 of FIG. 3 may be representative of any computer in which the control system 14 resides or partially resides.

Generally, in terms of hardware architecture, as shown in FIG. 3, the computer 12 includes a processor 16, memory 18, and one or more input and/or output (I/O) devices 20 (or peripherals) that are communicatively coupled via a local interface 22. The local interface 22 can be, for example, but not limited to, one or more buses or other wired or wireless connections, as is known in the art. The local interface 22 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 16 is a hardware device for executing software, particularly software stored in memory 18. The processor 16 can be any custom made or commercially available processor, a central processing unit (CPU), an auxiliary processor among several processors associated with the computer 12, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80.times.8 or Pentium series microprocessor from Intel Corporation, Intel Xeon (Single and Dual Core), Intel Xeon Processor MP (Single and Dual Core), a PowerPC microprocessor from IBM, a Sparc microprocessor from Sun Microsystems, Inc., or a 8xxx series microprocessor from Motorola Corporation.

The memory 18 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 18 may incorporate electronic, magnetic, optical, and/or other types of storage media. The memory 18 can have a distributed architecture where various components are situated remote from one another, but can be accessed by the processor 16.

The software in memory 18 may include one or more separate programs, each of which comprises an ordered listing of executable instructions for implementing logical functions. In the example of FIG. 3, the software in the memory 18 includes the control system 14 in accordance with the present invention and a suitable operating system (O/S) 24. A non-exhaustive list of examples of suitable commercially available operating systems 24 is as follows: (a) a Windows operating system available from Microsoft Corporation, including Microsoft Vista and Windows Mobile Client; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 24 essentially controls the execution of other computer programs, such as the control system 14, and provides scheduling, input-output control, file and data management, memory management, and communication control and related services.

The control system 14 may be a source program, executable program (object code), script, or any other entity comprising a set of instructions to be performed. When a source program, the program needs to be translated via a compiler, assembler, interpreter, or the like, which may or may not be included within the memory 18, so as to operate properly in connection with the O/S 24. Furthermore, the control system 14 can be written as (a) an object oriented programming language, which has classes of data and methods, or (b) a procedure programming language, which has routines, subroutines, and/or functions, for example but not limited to, C, C++, C# (C Sharp), PHP, Pascal, Basic, Fortran, Cobol, Perl, Java, and Ada. In one embodiment, the control system 14 is written in C++. The I/O devices 20 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 20 may also include output devices, for example but not limited to, a printer, bar code printers, displays, etc. Finally, the I/O devices 20 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 12 is a PC, workstation, PDA, or the like, the software in the memory 18 may further include a basic input output system (BIOS) (not shown in FIG. 3). The BIOS is a set of software routines that initialize and test hardware at startup, start the O/S 24, and support the transfer of data among the hardware devices. The BIOS is stored in ROM so that the BIOS can be executed when the computer 12 is activated.

When the computer 12 is in operation, the processor 16 is configured to execute software stored within the memory 18, to communicate data to and from the memory 18, and to generally control operations of the computer 12 pursuant to the software. The control system 14 and the O/S 24, in whole or in part, but typically the latter, are read by the processor 16, perhaps buffered within the processor 16, and then executed.

When the control system 14 is implemented in software, as is shown in FIG. 3, it should be noted that the control system 14 can be stored on any computer readable medium for use by or in connection with any computer related system or method. In the context of this document, a "computer-readable medium" can be any medium that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). The control system 14 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where the control system 14 is implemented in hardware, the control system 14 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
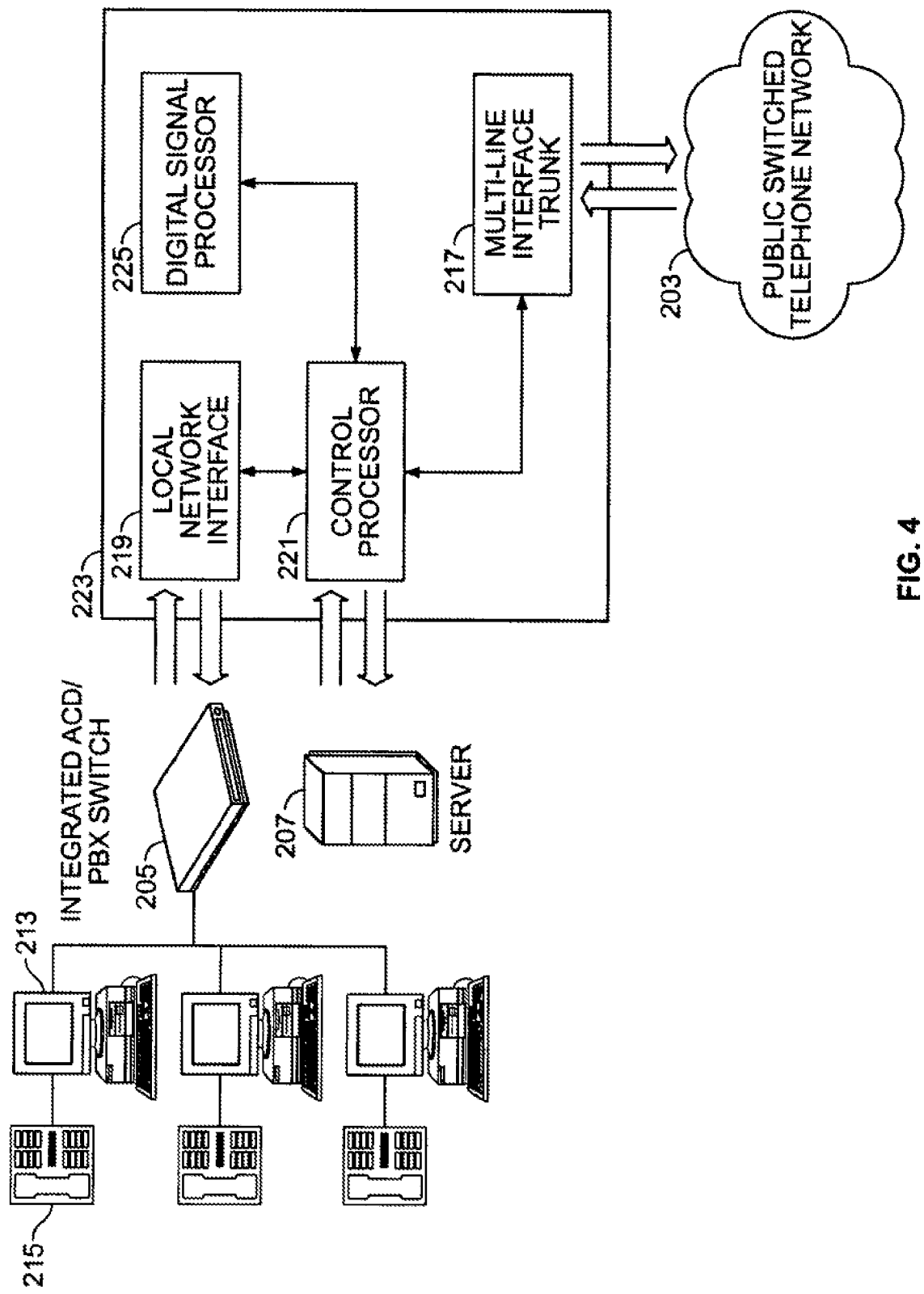
FIG. 4 is a block diagram of a telephonic communication system with a multi-port PSTN module according to the present invention.

As may be seen in FIG. 4, a customer sending a telephonic signal may access a contact center 10 directly through the public switched telephone network (PSTN) 203. Alternatively, the telephonic signal can be distributed through a private branch exchange (PBX), having a public switched telephone network (PSTN) 203 connected to the PBX through a PBX switch 205. The PBX switch 205 provides an interface between the PSTN 203 and a local network. Preferably, the interface is controlled by software stored on a telephony server 207 coupled to the PBX switch 205. The PBX switch 205, using interface software, connects trunk and line station interfaces of the public switch telephone network 203 to stations of a local network or other peripheral devices contemplated by one skilled in the art. Further, in another embodiment, the PBX switch may be integrated within a telephony server 207. The stations may include various types of communication devices connected to the network, including the telephony server 207, a recording server 209, telephone stations 215, and client personal computers 213 equipped with telephone stations 215. The local network may further include fax machines and modems and other devices.

According to the present invention, computer telephony integration ("CTI") technology is provided. In a preferred embodiment discussed herein, CTI resides on a telephony server 207. However, it will be understood by those skilled in the art that CTI can reside on its own server or at other hardware described herein. Generally, in terms of hardware architecture, the telephony server 207 includes a processor, memory, and one or more input and/or output (I/O) devices (or peripherals) that are communicatively coupled via a local interface. The processor can be any custom-made or commercially available processor, a central processing unit (CPU), an auxiliary processor among several processors associated with the telephony server 207, a semiconductor based microprocessor (in the form of a microchip or chip set), a macroprocessor, or generally any device for executing software instructions. The memory of the telephony server 207 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 207 may further include a keyboard and a mouse for control purposes, and an attached graphic monitor for observation of software operation. It will be understood that the telephony server may include standard CTI technology, such as that sold by Cisco, Avaya, Genesys or other provider of CTI providers.

According to one embodiment, the telephony server 207 also incorporates PBX control software to control the initiation and termination of connections between stations and via outside trunk connections to the PSTN 203. In addition, the software may monitor the status of all telephone stations 211 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module 223 and PCs to implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

Referring to FIG. 4, in one embodiment, the telephony server 207 is equipped with multi-port PSTN module 223 having circuitry and software to implement a trunk interface 217 and a local network interface 219. The PSTN module 223 comprises a control processor 221 to manage the transmission and reception of network messages between the PBX switch 205 and the telephony server 207. The control processor 221 is also capable of directing network messages between the PBX switch 205, the local network interface 291, the telephony network server 207, and the trunk interface 217. In the one embodiment, the local network uses Transmission Control Protocol/Internet Protocol (TCP/IP), known as Voice Over IP (VoIP). The network messages may contain computer data, telephony transmission supervision, signaling and various media streams, such as audio data and video data. The control processor 221 directs network messages containing computer data from the PBX switch 205 to the telephony network server 207 directly through the multi-port PSTN module 223.

The control processor 221 may include buffer storage and control logic to convert media streams from one format to another, if necessary, between the trunk interface 217 and local network. The trunk interface 217 provides interconnection with the trunk circuits of the PSTN 203. The local network interface 219 provides conventional software and circuitry to enable the telephony server 207 to access the local network. The buffer RAM and control logic implement efficient transfer of media streams between the trunk interface 217, the telephony server 207, the digital signal processor 225, and the local network interface 219.

The trunk interface 217 utilizes conventional telephony trunk transmission supervision and signaling protocols required to interface with the outside trunk circuits from the PSTN 203. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 221 manages real-time telephony event handling pertaining to the telephone trunk line interfaces, including managing the efficient use of digital signal processor resources for the detection of caller ID, DTMF, call progress and other conventional forms of signaling found on trunk lines. The control processor 221 also manages the generation of telephony tones for dialing and other purposes, and controls the connection state, impedance matching, and echo cancellation of individual trunk line interfaces on the multi-port PSTN module 223.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 221 to the telephony server 207 to notify the PBX software in the telephony server 207 of real-time telephony events on the attached trunk lines. Network messages are received from the PBX Switch 205 to implement telephone call supervision and may control the set-up and elimination of media streams for voice transmission.

The local network interface 219 includes conventional circuitry to interface with the local network. The specific circuitry is dependent on the signal protocol utilized in the local network. In one embodiment, the local network may be a local area network (LAN) utilizing IP telephony. IP telephony integrates audio and video stream control with legacy telephony functions and may be supported through the H.323 protocol. H.323 is an International Telecommunication Union-Telecommunications protocol used to provide voice and video services over data networks. H.323 permits users to make point-to-point audio and video phone calls over a local area network. IP telephony systems or VoIP can be integrated with the public telephone system through a local network interface 219, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 203 is routed to the IP/PBX-PSTN gateway and translates the conventional telephone protocol to H.323 protocol.

As noted above, PBX trunk control messages are transmitted from the telephony server 207 to the control processor 221 of the multi-port PSTN. In contrast, network messages containing media streams of digital representations of real-time voice are transmitted between the trunk interface 217 and local network interface 219 using the digital signal processor 225. The digital signal processor 225 may include buffer storage and control logic. Preferably, the buffer storage and control logic implement a first-in-first-out (FIFO) data buffering scheme for transmitting digital representations of voice audio between the local network to the trunk interface 217. It is noted that the digital signal processor 225 may be integrated with the control processor 221 on a single microprocessor.

The digital signal processor 225 can include a coder/decoder (CODEC) connected to the control processor 221. The CODEC may be a type TCM29c13 integrated circuit made by Texas Instruments, Inc. In one embodiment, the digital signal processor 225 receives an analog or digital voice signal from a station within the network or from the trunk lines of the PSTN 203. The CODEC converts the analog voice signal into in a digital from, such as digital data packets. It should be noted that the CODEC is not used when connection is made to digital lines and devices. From the CODEC, the digital data is transmitted to the digital signal processor 225 where telephone functions take place. The digital data is then passed to the control processor 221 which accumulates the data bytes from the digital signal processor 225. It is preferred that the data bytes are stored in a first-in-first-out (FIFO) memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 219. Among other information, the data packet contains a source address, a destination address, and audio data. The source address identifies the location the audio data originated from and the destination address identifies the location the audio data is to be sent.

The system permits bidirectional communication by implementing a return path allowing data from the local network, through the local network interface 219, to be sent to the PSTN 203 through the multi-line PSTN trunk interface 217. Data streams from the local network are received by the local network interface 219 and translated from the protocol utilized on the local network to the protocol utilized on the PSTN 203. The conversion of data may be performed as the inverse operation of the conversion described above relating to the IP/PBX-PSTN gateway. The data stream is restored in appropriate form suitable for transmission through to either a connected telephone 211, 215 or an interface trunk 217 of the PSTN module 223, or a digital interface such as a T1 line or ISDN. In addition, digital data may be converted to analog data for transmission over the PSTN 203.

Generally, the PBX switch of the present invention may be implemented with hardware or virtually. A hardware PBX has equipment located local to the user of the PBX system. The PBX switch 205 utilized may be a standard PBX manufactured by Cisco, Avaya, Siemens AG, NEC, Nortel, Toshiba, Fujitsu, Vodavi, Mitel, Ericsson, Panasonic, or InterTel. In contrast, a virtual PBX has equipment located at a central telephone service provider and delivers the PBX as a service over the PSTN 203.

The Recording Server

As illustrated in FIG. 2, the system includes a recording server 209 for recording network messages transmitted within the system. The recording server 209 may be connected to a port on the local network to the PSTN trunk line or by other known methods of interface and connection. The recording server 209 is also communicably coupled to the telephony server 207. The recording server 209 includes a control system software, namely, recording software. The recording software of the invention can be implemented in software (e.g., firmware), hardware, or a combination thereof. In a currently contemplated preferred embodiment, the recording software is implemented in software, as an executable program, and is executed by one or more special or general purpose digital computer(s). The recording software may reside in, or have portions residing in any computer such as, but not limited to, a general purpose personal computer.

Generally, hardware architecture is the same as that discussed above and shown in FIG. 3. Specifically, the recording server 209 includes a processor, memory, and one or more input and/or output (I/O) devices (or peripherals) that are communicatively coupled via a local interface as previously described. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

In one preferred embodiment, the recording server 209 incorporates recording software for recording a telephone signal based on the source address and/or destination address of the signal. The method utilized by the recording server 209 depends on the communication protocol utilized on the communication lines to which the recording server 209 is coupled. The signal carrying audio data of a communication between at least two users can be an analog signal or a digital signal in the form of a network message. In one embodiment, the signal is an audio data transmitted according to a signaling protocol, for example the H.323 protocol described above.

Figure 5:
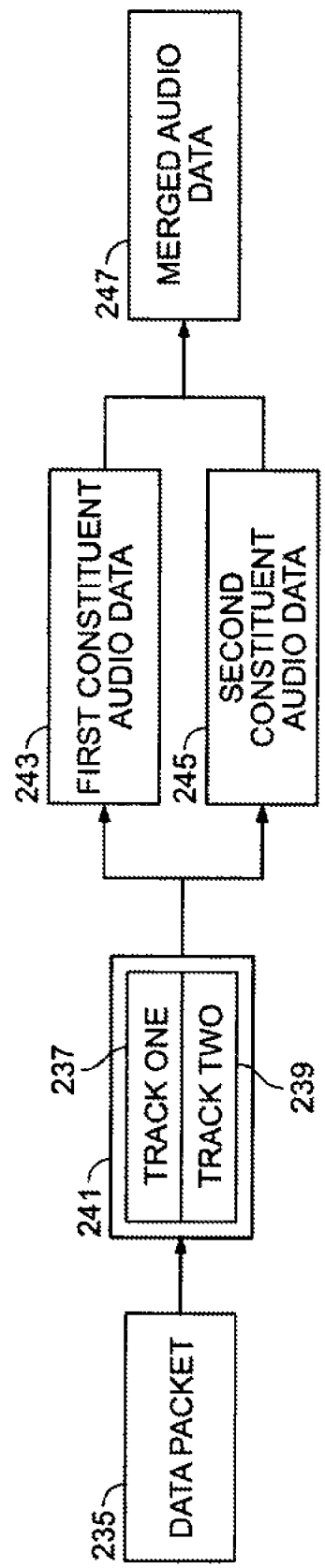
FIG. 5 is a flow chart illustrating a process of recording and separating a telephonic communication.

One example of a recording method that may be used in the present system is illustrated in FIG. 5 and described herein. In the embodiment of FIG. 5, when an outside caller reaches the system through the multi-line interface trunk 217, their voice signal is digitized (if needed) and converted into digital data packets 235 according to the communication protocol utilized on the local network of the system. The data packet 235 comprises a source address identifying the address of the outside caller, a destination address identifying the address of the call center agent, and first constituent audio data comprising at least a portion of the outside callers voice. The data packet 235 can further comprise routing data identifying how the data packet 235 should be routed through the system and other relevant data. Once the data packet 235 is created, the data packet 235 is sent to the appropriate destination on the local network, such as to a call center agent, through the local network interface 219. The PBX and/or an automatic call distributor (ACD) can determine the initial communication setup, such as the connection state, impedance matching, and echo cancellation, according to predetermined criteria.

Similar to the process described above, when the call center agent speaks, their voice is digitized (if needed) and converted into digital data packet 235 according to the communication protocol utilized on the local network. The data packet 235 comprises a source address identifying the address of the call center agent, a destination address identifying the address of the outside caller, and second constituent audio data comprising at least a portion of the call center agent's voice. The data packet 235 is received by the local network interface 219 and translated from the communication protocol utilized on the local network to the communication protocol utilized on the PSTN 203. The conversion of data can be performed as described above. The data packet 235 is restored in appropriate form suitable for transmission through to either a connected telephone 211, 215 or a interface trunk 217 of the PSTN module 223, or a digital interface such as a T1 line or ISDN. In addition, digital data can be converted to analog data for transmission through the PSTN.

The recording server 209 receives either a data packet 235 comprising: the source address identifying the address of the outside caller, a destination address identifying the address of the call center agent, and the first constituent audio data comprising at least a portion of the outside callers voice; or a data packet 235 comprising a source address identifying the address of the call center, a destination address identifying the address of the outside caller, and second constituent audio data comprising at least a portion of the customer's agent voice. It is understood by one of ordinary skill in the art that the recording server 209 is programmed to identify the communication protocol utilized by the local network and extract the audio data within the data packet 235. In one embodiment, the recording server 209 can automatically identify the utilized communication protocol from a plurality of communication protocols. The plurality of communication protocols can be stored in local memory or accessed from a remote database.

The recording server 209 comprises recording software to record the communication session between the outside caller and a call center agent in a single data file in a stereo format. The first data file 241 has at least a first audio track 237 and a second audio track 237. Once a telephone connection is established between an outside caller and a call center agent, the recording software creates a first data file 241 to record the communication between the outside caller and the call center agent. It is contemplated that the entire communication session or a portion of the communication session can be recorded.

Upon receiving the data packet 235, the recording server 209 determines whether to record the audio data contained in the data packet 235 in either the first audio track 237 or the second audio track 239 of the first data file 241 as determined by the source address, destination address, and/or the audio data contained within the received data packet 235. Alternatively, two first data files can be created, wherein the first audio track is recorded to the one of the first data file and the second audio track is recorded to the second first data file. In one embodiment, if the data packet 235 comprises a source address identifying the address of the outside caller, a destination address identifying the address of the call center agent, and first constituent audio data, the first constituent audio data is recorded on the first audio track 237 of the first data file 241. Similarly, if the data packet 235 comprises a source address identifying the address of the call center agent, a destination address identifying the address of the outside caller, and second constituent audio data, the second constituent audio data is recorded on the second audio track 239 of the first data file 241. It should be noted the first and second constituent audio data can be a digital or analog audio waveform or a textual translation of the digital or analog waveform. The recording process is repeated until the communication link between the outside caller and call center agent is terminated.

As noted above, the recording server 209 can be connected to the trunk lines of the PSTN 203 as seen in FIG. 2. The PSTN 203 can utilize a different protocol and therefore, the recording server 209 is configured to identify the communication protocol utilized by the PSTN 203, recognize the source and destination address of a signal and extract the audio data from the PSTN 203. The recording server 209 is programmed in a manner as known to one of ordinary skill in the art.

Once the communication link is terminated, the recording server 209 ends the recording session and stores the single data file having the recorded communication session in memory. After the first data file is stored in memory, the recording server 209 can extract either or both of the first constituent audio data from the first audio track of the first data file or the second constituent audio data from the second audio track of the first data file. In one embodiment, the first constituent audio data extracted from the first audio track is stored in a first constituent data file 243. Similarly, the second constituent audio data extracted from the second audio track can be stored in a second constituent data file 245. The first and second constituent data files 243, 245 can be compressed before being stored in memory. The extracted data can be in the form of a digital or analog audio waveform or can be a textual translation of the first or second constituent audio data. It is contemplated that either or both of the first constituent data file 243 or the second constituent data file 245 can be further analyzed or processed. For example, among other processes and analyses, filtering techniques can be applied to the first constituent data file and/or the second constituent data file. Moreover, event data, such as silence periods or over-talking, can be identified through analysis techniques known to those skilled in the art.

Further, as illustrated in FIG. 5, the first constituent data file 243 and second constituent data file 245 can be merged together into a single second data file 247. The first and second constituent data files can be merged in a stereo format where the first constituent audio data from the first constituent data file 243 is stored on a first audio track of the second data file 247 and the second constituent audio data from the second constituent data file 245 is stored on a second audio track of the second data file 247. Alternatively, the first and second constituent data files can be merged in a mono format where the first constituent audio data from the first constituent data file 243 and the second constituent audio data from the second constituent data file 245 are stored on a first audio track of the second data file 247. Additionally, the first and second constituent audio data can be merged into a document having a textual translation of the audio data. In such a case, identifiers can be associated with each of the merged first and second constituent audio data in order to associate the merged first constituent audio data with the outside caller, and associate the merged second constituent audio data with the call center agent. The second data file 247 can be compressed before being stored.

It is known in the art that "cradle-to-grave" recording may be used to record all information related to a particular telephone call from the time the call enters the contact center to the later of: the caller hanging up or the agent completing the transaction. All of the interactions during the call are recorded, including interaction with an IVR system, time spent on hold, data keyed through the caller's key pad, conversations with the agent, and screens displayed by the agent at his/her station during the transaction.

Figure 6:
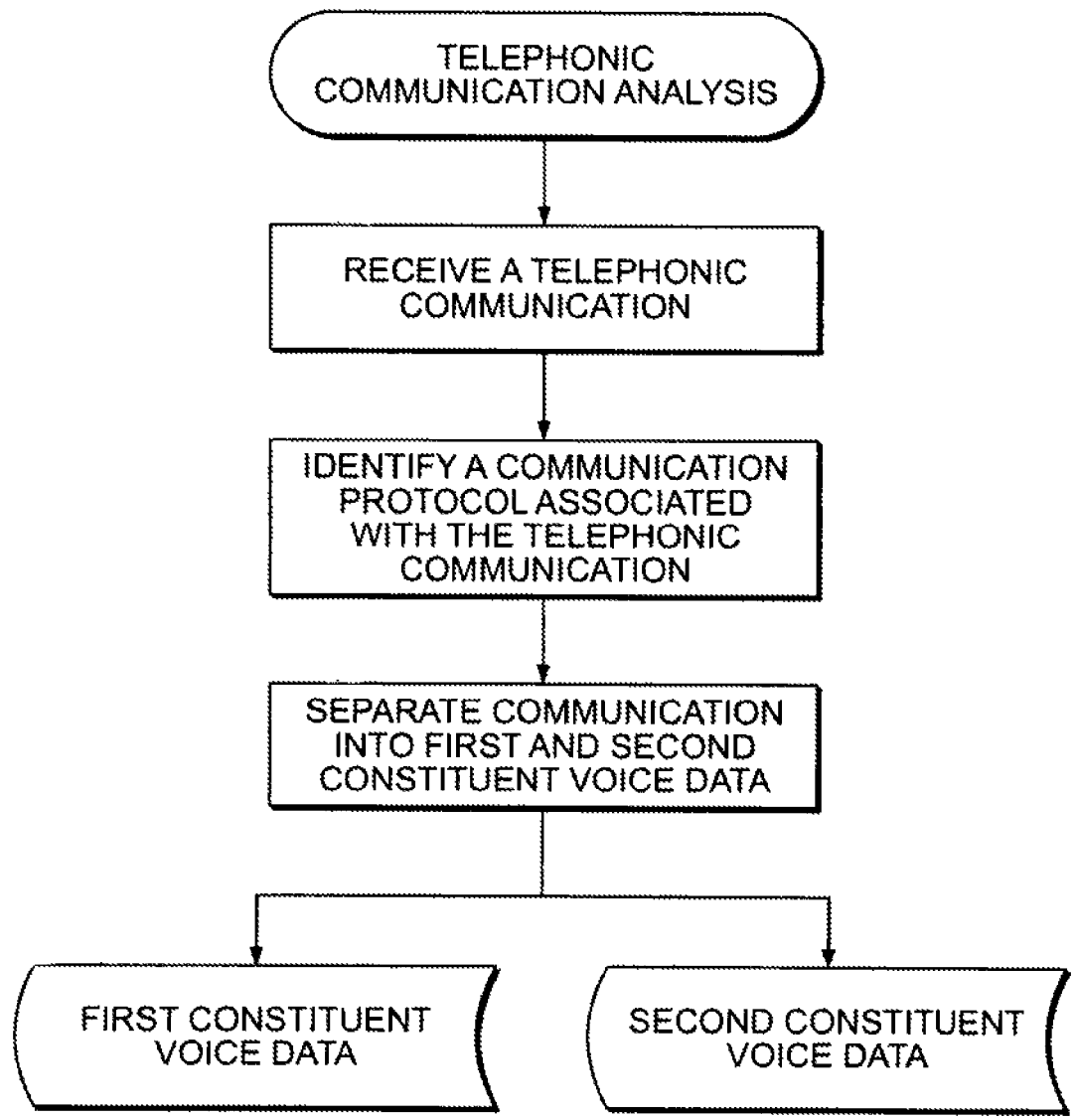
FIG. 6 is a flow chart illustrating a process of recording and separating a telephonic communication.
Figure 7:
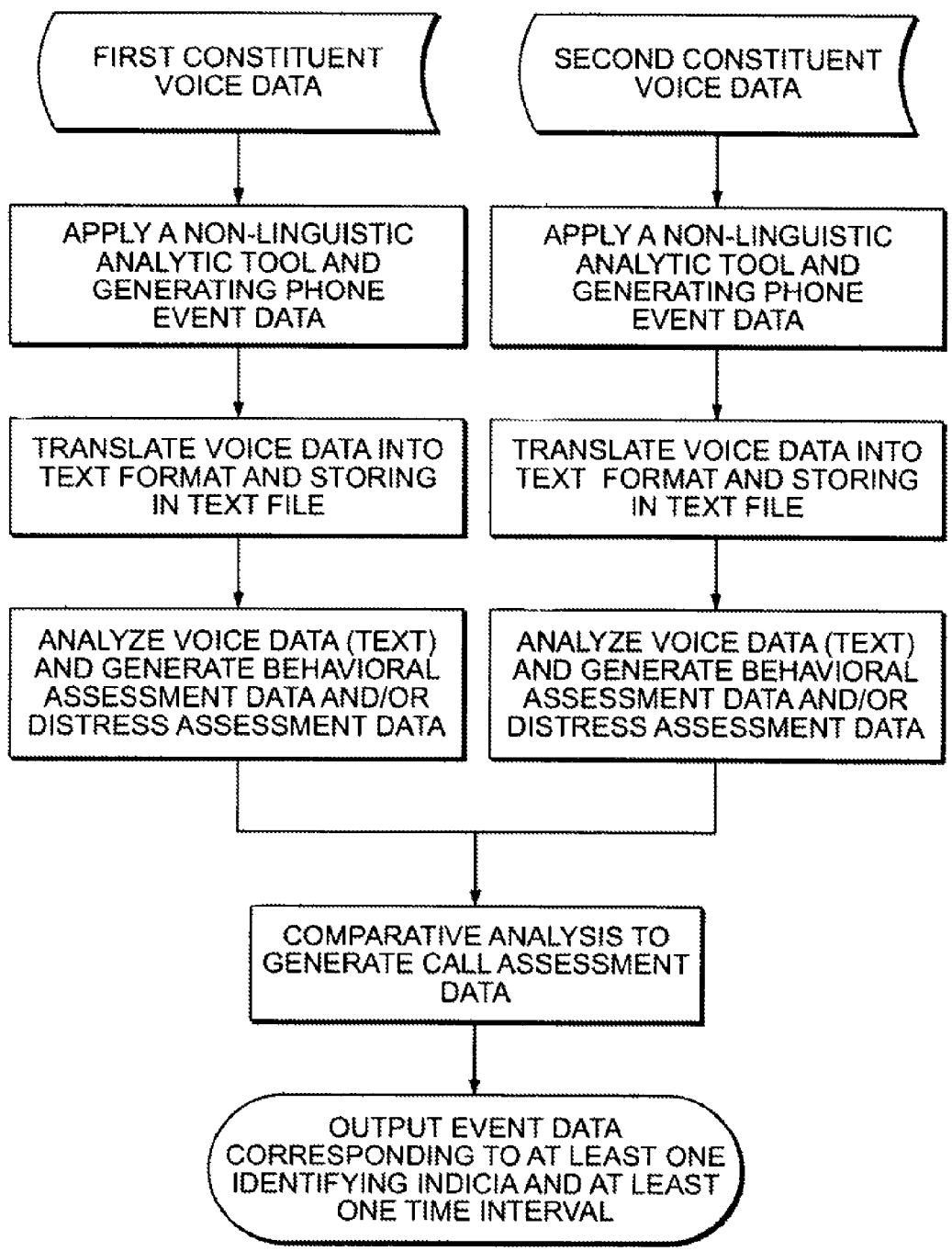
FIG. 7 is a flow chart illustrating a process of analyzing voice data of a telephonic communication.
Figure 8:
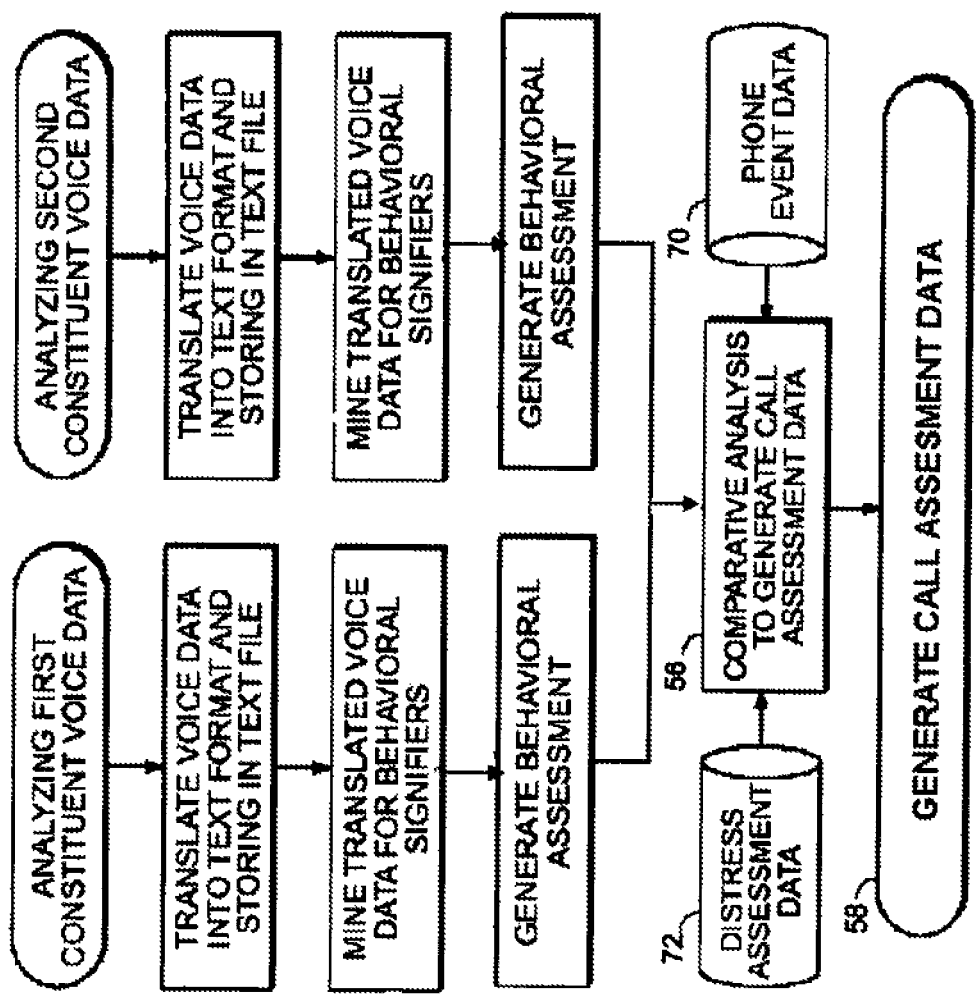
FIG. 8 is a flow chart illustrating a process of analyzing voice data of a telephonic communication.

As shown in FIGS. 6-8, once the first and second constituent voice data are separated one from the other, each of the first and second constituent voice data can be independently mined and analyzed. It will be understood that "mining" as referenced herein is to be considered part of the process of analyzing the constituent voice data. It is also contemplated by the present invention that the mining and behavioral analysis can be conducted on either or both of the constituent voice data.

It is contemplated by the present invention that mining and analysis in accordance with the present invention can be applied directly to voice data configured in audio format. Preferably, however, the voice data to be mined and analyzed is first translated into a text file. It will be understood by those of skill that the translation of audio to text and subsequent data mining may be accomplished by systems known in the art. For example, the method of the present invention may employ software such as that sold under the brand name Audio Mining SDK by Scansoft, Inc., or any other audio mining software suitable for such applications.

In one embodiment of the present invention, the voice data is mined for behavioral signifiers associated with a linguistic-based psychological behavioral model. In particular, the voice data is searched for text-based keywords (i.e., behavioral signifiers) relevant to a predetermined psychological behavioral model. One preferred such psychological behavioral model and behavioral analysis is described in commonly assigned U.S. patent application Ser. No. 11/131,486, which is incorporated herein by reference.

As shown in FIG. 8, the resultant behavioral assessment data 55 derived from the analysis of the single voice data may be used to evaluate qualities of a single communicant (e.g., the customer or agent behavioral type, etc.), and to route future calls as described in further detail herein. In any event, the results generated by analyzing voice data through application of a psychological behavioral model to the voice data are stored in a customer history database 302 for subsequent analysis of the communication, as well as for use in routing the call.

In addition to the behavioral assessment of voice data, the method of the present invention may also employ distress analysis of voice data. Linguistic-based distress analysis is preferably conducted on both the textual translation of the voice data and the audio file containing voice data. Accordingly, linguistic-based analytic tools as well as non-linguistic analytic tools may be applied to the audio file. For example, one of skill in the art may apply spectral analysis to the audio file voice data while applying a word spotting analytical tool to the text file. Linguistic-based word spotting analysis and known algorithms for identifying distress can be applied to the textual translation of the communication. Preferably, the resultant distress data is also stored in the customer history database 302 for subsequent analysis of the communication and use in call routing.

It is also often desirable to analyze non-linguistic phone events occurring during the course of a conversation such as hold times, transfers, "dead-air," overtalk, etc. Accordingly, in one embodiment of the present invention, phone event data resulting from analysis of these non-linguistic events is generated. As shown in FIG. 7, the phone event data is preferably generated by analyzing non-linguistic information from both the separated constituent voice data, or from the subsequently generated audio file containing at least some of the remerged audio data of the original audio waveform. It is also contemplated that the phone event data can be generated before the audio waveform is separated. The generated phone event data can also be stored in the customer history database to use in future call routing.

According to a preferred embodiment of the invention shown in FIG. 8, the customer voice data is mined and analyzed. The resulting behavioral assessment data 55, phone event data 70 and distress assessment data 72 from the analyzed voice data are comparatively analyzed in view of the parameters of the psychological behavioral model to provide an assessment of a given communication 56. From this comparative analysis, call assessment data relating to the totality of the call may be generated 58.

Generally, call assessment data 58 is comprised of behavioral assessment data 55, phone event data 70 and distress assessment data 72. The resultant call assessment data 58 may be subsequently viewed to provide an objective assessment or rating of the quality, satisfaction or appropriateness of the interaction between an agent and a customer. The call assessment data 58 may generate resultant data that is also useful for characterizing the success of the interaction between a customer and an agent and for determining desired routing of subsequent phone calls from the same customer.

According to the present invention, the system can employ a word-spotting algorithm that categorizes communications into particular types or categories based on words used in the communication. In one embodiment, each communication is automatically categorized as a service call type (e.g., a caller requesting assistance for servicing a previously purchased product), a retention call type (e.g., a caller expressing indignation, or having a significant life change event), or a sales call type (e.g., a caller purchasing an item offered by a seller). In one scenario, it may be desirable to analyze all of the "sales call type" communications received by a contact center during a predetermined time frame. In that case, the user would analyze each of the sales call type communications from that time period by applying the predetermined psychological behavioral model to each such communication.

Alternatively, the communications may be grouped according to customer categories, and the user may desire to analyze the communications between the call center and communicants within a particular customer category. For example, it may be desirable for a user to perform an analysis only of a "platinum customers" category, consisting of high end investors, or a "high volume distributors" category comprised of a user's best distributors.

As shown in FIG. 2, the recording server 209 is communicably coupled to a customer history database 302 configured to store historic data relating to telephonic communications recorded by the recording server 209. More particularly, the customer history database 302 is preferably a relational database that stores call assessment data (i.e., behavioral assessment data, phone event data and distress assessment data) corresponding to the customer identifier to which that communication and call assessment data is associated. Additionally, the customer history database 302 is configured to store call preference data and the customer profile associated with the corresponding customer identifier. It is contemplated that the customer profile includes information based upon one or more of the following components of a customer's demographic identity: gender, race, age, income, education, and personality type. It is also contemplated that other information relating to a customer's demographic identity can be included in the customer profile. Further, information relating to a customer's preference for resolving a communication directly with an agent or through an IVR environment also can be included in the customer history database.

Thus, according to one embodiment of the present invention, the system includes and IVR system 206 a telephone switch 205, a recording server 209 and a routing server 300. The IVR system 206 is configured to receive telephonic communications and caller commands. The IVR system 206 is also configured to communicate with a telephone switch 205 and a routing server 300. The telephone switch 205 is configured to route a telephonic communication to one of a plurality of communication destination addresses.

According to one embodiment of the present invention, the recording server 209 is operably coupled, and in operable communication with the routing server 300. As discussed above, the recording server 209 is configured to record a telephonic communication between a caller and a customer service representative. The recording server 209 uses logic to perform the recording functions as described above. As previously noted, the logic can be in the form of hardwired logic gates or software. Thus, logic is provided to generate behavioral assessment data as discussed above. According to one embodiment shown in FIGS. 6-8, the behavioral assessment data is generated by analyzing the caller voice data by: mining the caller voice data and applying a linguistic-based psychological behavioral model to the caller voice data. Logic is also provided to generate distress assessment data 72 and call preference data 71. The generated behavioral assessment data 55, distress assessment data 72 and call preference data 71 is transmitted to a customer history database 302 as described above.

The Routing Server

As illustrated in FIG. 2, the system also includes a routing server 300 configured to receive a transmitted customer identifier and communicate to a switch 205, typically via the telephony server 207, the appropriate communication destination address to which to route a call. Like the recording server 209, the routing server 300 may be connected to a port on the local network. Alternatively, the routing server 300 may be connected to a PSTN trunk line. The routing server is also communicably coupled to the telephony server 207. The routing server 300 includes a control system software, such as routing software. The routing software of the invention can be implemented in software (e.g., firmware), hardware, or a combination thereof. In the currently contemplated best mode, the recording software is implemented in software, as an executable program, and is executed by one or more special or general purpose digital computer(s). The routing software may reside in, or have portions residing in, any computer such as, but not limited to, a general purpose personal computer.

Generally, hardware architecture is the same as that discussed above and shown in FIG. 3. Specifically, the routing server 300 includes a processor and memory. The routing server 300 can also include one or more input and/or output (I/O) devices (or peripherals) that are communicatively coupled via a local interface as previously described. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

As noted above, the routing server 300 incorporates software for receiving a transmitted customer identifier. The customer identifier can be received from an IVR, directly from the PSTN 203 or from other input device. The routing server 300 also incorporates software for sending instructions for routing a telephonic communication to an appropriate communication destination address based on certain criteria. More particularly, the routing server 300 is configured to receive a customer identifier. It will be understood that the customer identifier may be generated by any conventional means, including but not limited to, automatic number identification (ANI), voice portal prompted variables, IP addresses or any other suitable identifiers.

The routing server 300 determines whether the received customer identifier corresponds to a stored customer identifier in a customer history database 302. As discussed herein, the customer history database 302 is configured to store historic data. That historic data is associated with at least one recorded telephonic communication having a corresponding stored customer identifier. The stored historic data is comprised of at least one of the following: call type data, distress assessment data, behavioral assessment data, call preference data and customer profile.

The routing server 300 also analyzes the historic data corresponding to the received customer identifier and the stored customer identifier. The telephonic communication is associated with one of a plurality of communication destination addresses. This association step is based on the analysis of the historic data. Finally, the routing sever 300 transmits a signal identifying the associated communication destination address. This signal may be transmitted directly to a switch mechanism or through CTI.

According to one embodiment of the present invention, the routing server 300 compares a stored customer profile with a customer service representative profile. In this manner, the system or software of the present invention can include in a call routing analysis consideration of a scored comparison of the compatibility of the customer with the customer service representative. The customer profile score can be generated as a result of an analysis of various one or ones of demographic identifiers associated with a customer and a customer service representative. Accordingly, in one preferred embodiment in which the customer profile score is based on a personality (derived from the behavioral assessment data) and gender match, the scoring may be allocated according to the following scale in Table 1:

TABLE 1

| Customer/CSR Match | Score |
| --- | --- |
| Strong Personality Match, Same Gender | 1 |
| Strong Personality Match, Different Gender | 2 |
| Moderate Personality Match, Same Gender | 3 |
| Moderate Personality Match, Different Gender | 4 |
| Weak Personality Match, Same Gender | 5 |
| Weak Personality Match, Different Gender | 6 |

The routing server 300 can be, according to one embodiment, configured to transmit an audible message based on the association of the telephonic communication with a communication destination address. Accordingly, it is contemplated that upon selection of an appropriate communication destination address to which a telephonic communication will be routed, the system indicates to the customer the ultimate destination of the telephonic communication. It will be understood that the audible message is not limited to an indication of the communication destination address, but instead may communicate other information relating to the analysis of the customer history database.

It is also useful to gather an understanding of the number of transactions that a customer associated with a customer identifier has completed in IVR or another interface (such as a web interface). In particular, such information can be useful in determining whether to route a customer telephonic communication through IVR or directly to a customer service representative agent. Thus, according to one embodiment of the present invention, the system further determines the number of previously completed transactions in IVR corresponding to a received customer identifier.

According to one embodiment of the invention, the system is further configured to generate a customer route record. The route record will include relevant information about the caller and the call activity. For example, the route record may include information relating to the call frequency, call type, the customer profile, the customer behavioral assessment data and distress assessment data. It will be understood that the route record can include other data relevant to the customer's interaction with a customer service representative agent or call center.

Using information from the customer route record, the system can generate audible messages appropriate for the customer during subsequent interactions. For example, an audible message relating to call type may be generated that states, "if you are calling about your previous [call type] on [date], please press 1." As another example, an audible message relating to a customers previous distress assessment data may be generated to state, "we understand you may have had an unsatisfactory experience in a call on [date]; recognizing your importance to us, we are routing your call to a specialized group of customer service representatives."

Thus, the present invention allows for automatic call routing based on past indicators and analytic attributes. The following chart (Table 2) outlines exemplary experiences of a customer during an interaction as a result of various analytic outputs.

TABLE 2

| Analytic Attribute | Analysis | Message | Routing |
| --- | --- | --- | --- |
| Self Service Preference Through IVR | X opt outs over Y period of time | "We understand your preference not to use our voice responsive system, so we are routing you directly to one of our customer service representatives" | Bypass IVR and route directly to a customer service representative |
| Call Type | Caller calls back within x days of a scored call | "If you are calling about your previous [insert call type] on [insert date], please press 1" | Route to a customized IVR script |
| Level of Distress | Caller calls back within x days after a scored call with high distress assessment values and no resolution | "We understand you may have had an unsatisfactory experience in a call on [insert date]; recognizing your | Bypass IVR and rout directly to specialized customer service representative |

TABLE 2-continued

| Analytic Attribute | Analysis | Message | Routing |
|---|---|---|---|
| | | importance to us, we are routing your call to a specialized group of customer service representatives." | |
| Profile Match | Match score based on personality and gender | No message | Attempt to rout to compatible customer service representative |

While the specific embodiments have been illustrated and described, numerous modifications come to mind without significantly departing from the spirit of the invention, and the scope of protection is only limited by the scope of the accompanying claims.

What is claimed is:

1. A non-transitory computer readable medium adapted to control a computer and comprising a plurality of code segments for automatically routing a telephonic communication to at least one of a plurality of communication destination addresses, the non-transitory computer readable medium comprising the code segments that, when executed by a processor:

receive a customer identifier;
determine whether the received customer identifier corresponds to a stored customer identifier in a customer history database, the customer history database being configured to store historic data associated with at least one recorded telephonic communication having a corresponding stored customer identifier, the stored historic data comprising call type data, distress assessment data, behavioral assessment data, call preference data and customer profile;
record the telephonic communication between a caller and a customer service representative and to separate the telephonic communication into caller voice data and customer service representative voice data and comprising logic that, when executed by a processor;
identifies a communication protocol associated with the telephonic communication;
records the telephonic communication to a first electronic data file comprising a first and second audio track, the caller voice data being automatically recorded on the first audio track based on the identified communication protocol, and the customer service representative voice data being automatically recorded on the second audio track based on the identified communication protocol;
generate behavioral assessment data by analyzing caller voice data associated with the telephonic communication by mining the caller voice data associated with the customer identifier and applying a linguistic-based psychological behavioral model to the caller voice data;
analyze the historic data corresponding to the received customer identifier and the stored customer identifier;
associate the telephonic communication with one of a plurality of communication destination addresses, the association of the telephonic communication data with one of the plurality of communication destination addresses being based on the analyzing of the historic data; and
transmit a signal identifying the associated communication destination address.

2. The non-transitory computer readable medium of claim 1, further comprising a code segment that, when executed by a processor compares a stored customer profile with a customer service representative profile.

3. The non-transitory computer readable medium of claim 2, further comprising a code segment that, when executed by a processor generates a score based upon the comparison of the stored customer profile with the customer service representative profile.

4. The computer readable medium of claim 1, further comprising a code segment that, when executed by a processor transmits an audible message based on the association of the telephonic communication with one of the plurality of communication destination addresses.

5. The non-transitory computer readable medium of claim 1, further comprising a code segment that, when executed by a processor generates a customer route record.

6. The non-transitory computer readable medium of claim 1, further comprising a code segment that, when executed by a processor determines the number of previously completed transactions in IVR corresponding to the received customer identifier.

7. The non-transitory computer readable medium of claim 1, wherein the customer identifier is generated by automatic number identification.

8. The non-transitory computer readable medium of claim 1, wherein the customer identifier is generated from at least one customer voice portal prompted variable.

9. The non-transitory computer readable medium of claim 1, wherein the historic data is comprised of stored behavioral assessment data, the stored behavioral data having been generated by mining voice data associated with a customer identifier and applying a linguistic-based psychological behavioral model to the voice data.

10. A system for automatically routing a telephonic communication to one of a plurality of communication destination addresses, the system comprising:

a customer history database storing historic data comprising call type data, distress assessment data, behavioral assessment data, call preference data, and customer profile, and the historic data being associated with a stored customer identifier; and,
a first server configured to receive a customer identifier input signal from a communication system, the server comprising logic that, when executed by a processor:
communicates with the customer history database;
determines whether the received customer identifier input signal corresponds to the stored customer identifier in the customer history database;
records the telephonic communication between a caller and a customer service representative and separates the telephonic communication into caller voice data and customer service representative voice data;
identifies a communication protocol associated with the telephonic communication; records the telephonic communication to a first electronic data file comprising a first and second audio track, the caller voice data being automatically recorded on the first audio track based on the identified communication protocol, and the customer service representative voice data being automatically recorded on the second audio track based on the identified communication protocol;

generates behavioral assessment data by analyzing caller voice data associated with the telephonic communication by mining the caller voice data associated with the customer identifier and applying a linguistic-based psychological behavioral model to the caller voice data;

analyzes historic data corresponding to the received customer identifier when the received customer identifier input signal corresponds to the stored customer identifier in the customer history database;

associates the telephonic communication with one of a plurality of communication destination addresses, the association being based on the analysis of the historic data corresponding to the received customer identifier; and, communicates the associated communication destination to a switch, wherein the switch is configured to route the telephonic communication to the associated communication destination address.

11. The system of claim 10, the server further comprising logic that, when executed by a processor compares the stored customer profile with a customer service representative profile.

12. The system of claim 11, the server further comprising logic that, when executed by a processor generates a score based upon the comparison of the stored customer profile with the customer service representative profile.

13. The system of claim 10, further comprising logic that, when executed by a processor transmits the behavioral assessment data to the customer history database.

14. A system for automatically routing a telephonic communication to one of a plurality of communication destination addresses, the system comprising:

an interactive voice response system configured to receive telephonic communications and caller commands, the interactive voice response system further being configured to communicate with a telephone switch and a routing server;

a telephone switch configured to route at least one of the received telephonic communications to one of a plurality of communication destination addresses;

a recording server in operable communication with the routing server, the recording server configured to record a telephonic communication between a caller and a customer service representative and to separate the telephonic communication into caller voice data and customer service representative voice data and comprising logic that, when executed by a processor:

generates behavioral assessment data by analyzing caller voice data associated with the telephonic communication by mining the caller voice data associated with the customer identifier and applying a linguistic-based psychological behavioral model to the caller voice data;

identifies a communication protocol associated with the telephonic communication;

records the telephonic communication to a first electronic data file comprising a first and second audio track, the caller voice data being automatically recorded on the first audio track based on the identified communication protocol, and the customer service representative voice data being automatically recorded on the second audio track based on the identified communication protocol;

generates distress assessment data associated with the caller voice data;

generates call preference data associated with the telephonic communication; and transmits the generated behavioral assessment data, distress assessment data and call preference data to a customer history database;

a routing server configured to receive a transmitted customer identifier from the interactive voice response system, the routing server comprising logic that, when executed by a processor:

receives the customer identifier;

determines whether the received customer identifier corresponds to a stored customer identifier in the customer history database, wherein the customer history database is configured to store historic data associated with at least one recorded telephonic communication having a corresponding stored customer identifier, the stored historic data comprising call type data, distress assessment data, behavioral assessment data, call preference data and customer profile;

analyzes the historic data corresponding to the received customer identifier and the stored customer identifier;

associates the at least one of the received telephonic communication communications with one of a plurality of communication destination addresses, wherein the association of the at least one of the received telephonic data communications with one of the predetermined communication destination addresses is based on the analysis of the historic data; and, transmits a signal identifying the associated communication destination address.

15. The system of claim 14, wherein the logic is embodied in a non-transitory computer readable medium that, when executed by a processor controls a computer.

* * * * *